US012174678B2

(12) United States Patent
Fujita et al.

(10) Patent No.: US 12,174,678 B2
(45) Date of Patent: Dec. 24, 2024

(54) INFORMATION PROCESSING DEVICE, COMPUTER-READABLE STORAGE MEDIUM, AND INFORMATION PROCESSING METHOD

(71) Applicant: HONDA MOTOR CO., LTD., Tokyo (JP)

(72) Inventors: Takahito Fujita, Saitama (JP); Ayaka Kai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/744,762

(22) Filed: May 16, 2022

(65) Prior Publication Data

US 2022/0276688 A1 Sep. 1, 2022

Related U.S. Application Data

(63) Continuation of application No. PCT/JP2020/042951, filed on Nov. 18, 2020.

(30) Foreign Application Priority Data

Nov. 19, 2019 (JP) ................................ 2019-209137

(51) Int. Cl.
*B60L 53/65* (2019.01)
*G06F 1/28* (2006.01)

(52) U.S. Cl.
CPC .................................... *G06F 1/28* (2013.01)

(58) Field of Classification Search
None
See application file for complete search history.

(56) References Cited

U.S. PATENT DOCUMENTS 8,855,681 B1 * 10/2014 George .................. H04W 4/02 455/456.2
9,894,167 B2 * 2/2018 Lefkowitz .............. H04L 67/52
(Continued)

FOREIGN PATENT DOCUMENTS

JP 2011132020 A 7/2011
JP 2015015827 A 1/2015
(Continued)

OTHER PUBLICATIONS

International Preliminary Report on Patentability for International Application No. PCT/JP2020/042951, issued by the International Bureau of WIPO on May 17, 2022.

*Primary Examiner* — Santosh R Poudel

(57) ABSTRACT

An information processing device comprises a prediction unit configured to predict a first user who uses a storage apparatus that stores a power storage device in a first time period subsequent to a current time point. The prediction unit may predict the first user based on usage information that indicates usage history of a second user who used storage apparatus in a second time period prior to the first time period. The usage information may include information related to a time frame when the second user used the storage apparatus in the second time period. The prediction unit may predict that at least some of the second users who used, in the second time period, the storage apparatus during a time frame to which the first time period belongs use the storage apparatus in the first time period.

13 Claims, 8 Drawing Sheets

(56) References Cited

U.S. PATENT DOCUMENTS

| | | | | |
|---|---|---|---|---|
| 2007/0271141 | A1* | 11/2007 | Storm | G06Q 30/06 705/16 |
| 2010/0094496 | A1* | 4/2010 | Hershkovitz | B60L 50/66 701/22 |
| 2011/0156662 | A1 | 6/2011 | Nakamura | |
| 2015/0039391 | A1* | 2/2015 | Hershkovitz | G06Q 30/0202 705/7.31 |
| 2019/0207393 | A1 | 7/2019 | Shih | |
| 2019/0241090 | A1 | 8/2019 | Wakitani | |
| 2020/0009983 | A1 | 1/2020 | Oshima | |
| 2020/0018800 | A1 | 1/2020 | Oshima | |
| 2021/0001744 | A1 | 1/2021 | Suzuki | |

FOREIGN PATENT DOCUMENTS

| | | | |
|---|---|---|---|
| JP | 2018072241 | A | 5/2018 |
| JP | 2018160072 | A | 10/2018 |
| JP | 2018160073 | A | 10/2018 |
| JP | 6564502 | B1 | 8/2019 |
| JP | 2019146474 | A | 8/2019 |
| WO | 2019181659 | A1 | 9/2019 |

* cited by examiner

600

620 640

| STATION ID | UER ID OF USERS WHO USED EACH STATION WITHIN A GIVEN TIME PERIOD | | | | | | |
|---|---|---|---|---|---|---|---|
| | SUNDAY | | | ··· | SATURDAY | | |
| | 0:00-01:00 | ··· | 23:00-24:00 | ··· | 0:00-01:00 | ··· | 23:00-24:00 |
| S_0001 | **, **, ··· | ··· | **, **, ··· | ··· | **, **, ··· | **, **, ··· | **, **, ··· |
| S_0002 | **, **, ··· | ··· | **, **, ··· | ··· | **, **, ··· | **, **, ··· | **, **, ··· |
| : | : | : | : | ··· | : | : | : |

| USER ID | MOST RECENT USAGE | | 25TH PERCENTILE OF USAGE INTERVALS [hr] |
|---|---|---|---|
| | STATION ID | DATE AND TIME | |
| U_0001 | S_0001 | 2019/10/22 15:54 | 72 |
| U_0002 | S_0002 | 2019/10/18 12:42 | 32 |
| U_0003 | S_0002 | 2019/10/22 10:10 | 20 |
| : | : | : | : |

INFORMATION PROCESSING DEVICE, COMPUTER-READABLE STORAGE MEDIUM, AND INFORMATION PROCESSING METHOD

The contents of the following Japanese application and International application are incorporated herein by reference:

NO. 2019-209137 filed in JP on Nov. 19, 2019; and

NO. PCT/JP2020/042951 filed in WO on Nov. 18, 2020.

BACKGROUND

1. Technical Field

The present invention relates to an information processing device, a computer-readable storage medium, and an information processing method.

2. Related Art

A charging station is known which accommodates a portable power bank and withdraws a power bank in response to a user's request (for example, see the patent documents 1 to 3). A plurality of charging stations are arranged in an area where power banks are available.

CITATION LIST

Patent Literature

Patent Document 1: Japanese Patent Application Publication No. 2018-160072

Patent Document 2: Japanese patent application publication No. 2018-160073

Patent Document 3: Japanese patent application publication No. 2018-072241

BRIEF DESCRIPTION OF DRAWINGS

FIG. 6 schematically shows an example of a data table 600.

FIG. 7 schematically shows an example of a data table 700.

DESCRIPTION OF EMBODIMENTS

Figure 1:
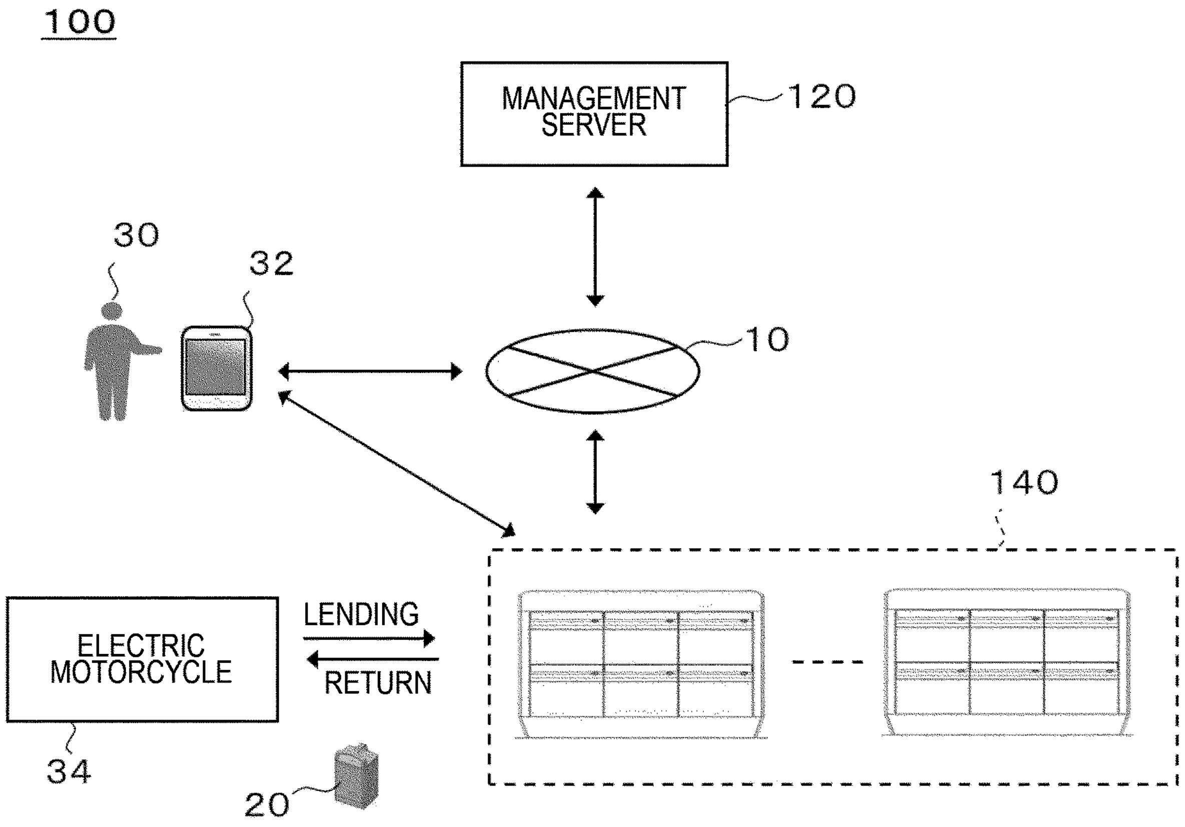
FIG. 1 schematically shows an example of a system configuration of a battery management system 100.

Hereinafter, the present invention will be described through embodiments of the invention, but the following embodiments do not limit the claimed invention. In addition, not all combinations of features described in the embodiments are essential to the solution of the invention. In the drawings, the same or similar parts are denoted by the same reference numerals, and redundant descriptions may be omitted.

(Overview of a Battery Management System 100)

FIG. 1 schematically shows an example of a system configuration of a battery management system 100. In the present embodiment, the battery management system 100 comprises a management server 120 and a battery station 140. In the present embodiment, a battery station 140 hold one or a plurality of (also it may be referred to as one or more) batteries 20. The battery management system 100 may comprise one or more battery stations 140.

In the present embodiment, the management server 120 and the battery station 140 can transmit/receive information with each other via a communication network 10. In the present embodiment, the management server 120 can transmit/receive information with a communication terminal 32 of a user 30 with each other via the communication network 10.

In the present embodiment, the detail of the battery management system 100 is described with an example of a case where the battery management system 100 provides one or more batteries 20 to the user 30. The battery management system 100 may provide one or more batteries 20 to each of one or more users 30.

For example, a user 30 requests lending of batteries 20 held by a specific battery station 140 from the battery management system 100 by using a communication terminal 32. The battery management system 100 performs processing for lending the above-described battery 20 to the user 30 in response to the above-described request for lending. In the present embodiment, the user 30 uses the battery 20 lent from the battery management system 100 as an electronic power source of an electric motorcycle 34.

While a battery 20 is repeatedly used, deterioration of the battery 20 progresses. Therefore, in the present embodiment, an administrator (not shown) of the battery 20 collects a battery 20 that deteriorated over a predefined management level from a battery station 140 and introduces a new battery 20 to the battery station 140. Thereby, the distribution of batteries 20 can be managed so that batteries 20 with appropriate charging and discharging performance are distributed.

In the present embodiment, the battery management system 100 manages the usage of each of one or more batteries 20. For example, the battery management system 100 manages lending states (for example, it is capable of lending, unable to lend, during lending, or the like), operational state (for example, it is charging, discharging, waiting, or the like), charging state (for example, it is a current SOC), storage state (for example, it is temperature, humidity, or the like), deterioration state, or the like of each of one or more batteries 20. Furthermore, the embodiment of providing the batteries 20 is not limited to lending.

(Overview of Each Unit of a Battery Management System 100)

In the present embodiment, the communication network 10 may be a transmission path of a wired communication, may be a transmission path of a wireless communication, or may be a combination of the transmission path of the wireless communication and the transmission path of the wired communication. The communication network 10 may include a wireless packet communication network, the Internet, a P2P network, a dedicated line, a VPN, an electric power line communication line, an Inter-vehicle communication line, a road-to-vehicle communication line, and the like. The communication network 10 (*i*) may include a mobile communication network such as a mobile phone network, or (ii) may include a wireless communication network such as a wireless MAN (for example, WiMAX (registered trademark)), a wireless LAN (for example, WiFi (registered trademark)), Bluetooth (registered trademark), ZigBee (registered trademark), or an NFC (near-field communication).

In the present embodiment, a battery 20 supplies electric power to the electric motorcycle 34. The battery 20 may be mounted on the electric motorcycle 34. The battery 20 may be attachably and detachably mounted on the electric motorcycle 34. The battery 20 may be a replaceable power storage device. The battery 20 may be a portable power storage device.

According to the present embodiment, for example, when a battery 20 mounted on an electric motorcycle 34 goes low in remaining capacity, a user 30 will move the electric motorcycle 34 to a nearest battery station 140. When the electric motorcycle 34 arrives at the above-described battery station 140, the user 30, for example, requests lending of batteries 20 from a battery station 140. If there are batteries 20 that can be lent out in the battery station 140, the request for lending by the user 30 will be accepted. As a result, the user 30 will be allowed to take out charged batteries 20 that are accommodated in the battery station 140.

In an embodiment, the user 30 may request for lending of batteries 20 from a battery station 140 by operating an input apparatus (not shown) arranged in the battery station 140. In another embodiment, the user 30 may request for lending of batteries 20 from a battery station 140 via a communication terminal 32.

In these embodiments, whether lending of batteries 20 is possible may be determined by the battery station 140, may be determined by the management server 120, or may be determined by the cooperation of the management server 120 and the battery station 140. When whether lending of batteries 20 is possible is determined by the battery station 140, the battery station 140 may transmit information indicating a result of the determination, identification information of batteries 20 that are subject to be lent out, or the like to the management server 120.

In further another embodiment, the user 30 may request for lending of batteries 20 from the management server 120 via a communication terminal 32. The management server 120 identifies a battery station 140, and determines whether lending of batteries 20 is possible. For example, the management server 120 acquires, from the communication terminal 32, location information of the communication terminal 32 or identification information of the battery station 140, and identifies the battery station 140 by using the information. If there are batteries 20 that can be lent out in the battery station 140, the management server 120 accepts the request for lending by the user 30. The management server 120 may transmit, to the battery station 140, information indicating that the request for lending by the user 30 has been accepted.

Then, the user 30 detaches the battery 20 from the electric motorcycle 34. The user 30 returns the battery 20 that is detached from the electric motorcycle 34, for example, to a return space of batteries 20 provided at the battery station 140. For example, at this point, a connector of the returned battery 20 and a connector of the battery station 140 are electrically connected. Then, the battery station 140 charges the battery 20 at an appropriate period in preparation for the next usage of the returned battery 20. The battery station 140 may charge the battery 20 according to an instruction from the management server 120.

Then, the user 30 receives a charged battery 20 from the battery station 140. The user 30 may receive a single battery 20 or may receive a plurality of batteries 20. For example, when the minimum unit of the number of batteries 20 that are lent out is multiple, the user 30 receives a plurality of batteries 20. Then, the user 30 equips the electric motorcycle 34 with the charged batteries 20. Thereby, the battery 20 with reduced remaining capacity is replaced with the charged battery 20.

Furthermore, in another embodiment, for example, in a case where an electric motorcycle 34 is configured to be able to mount N batteries 20 (N is an integer of two or more), when the electric motorcycle 34 arrives at a battery station 140, the electric motorcycle 34 may be mounted with N−1 or fewer batteries 20. In this case, the user 30 may equip the electric motorcycle 34 with charged batteries 20 withdrawn from the battery station 140, without returning batteries 20 to the battery station 140.

In further another embodiment, for example, in a case where an electric motorcycle 34 is configured to be able to mount N batteries 20 (N is an integer of two or more), even when the number of the batteries 20 mounted on the electric motorcycle 34 is N−1 or fewer, the electric motorcycle 34 can move. Therefore, the user 30 may not receive charged batteries 20 from a battery station 140, after returning batteries 20 with reduced remaining capacity to the battery station 140.

In the present embodiment, a communication terminal 32 is used by a user 30. The communication terminal 32 functions as, for example, an interface between a battery management system 100 and a user 30.

In an embodiment, a communication terminal 32 accepts input from a user 30. The communication terminal 32 transmits various kinds of requests to a management server 120 based on the input from the user 30. Examples of the above-described requests include a search request for searching for a battery station 140 that matches with specific conditions, and a reservation request for reserving any batteries 20 or a specific battery 20 that are stored in a specific battery station 140, or the like.

In another embodiment, a communication terminal 32 outputs information to a user 30. For example, the communication terminal 32 outputs, to the user 30, information received from a management server 120. Embodiments of outputting information are not particularly limited. The communication terminal 32 may output an image, or may output an sound.

In further another embodiment, a communication terminal 32 functions as, for example, an interface between a management server 120 and a battery station 140. For example, the communication terminal 32 acquires specific types of information from a battery station 140 by a near-field wireless communication or a wired communication. The communication terminal 32 transmits, to the management server 120, information acquired from the battery station 140. Examples of the specific types of information described above include identification information of the battery station 140, information related to batteries 20 stored in the battery station 140, or the like.

The communication terminal 32 can be any equipment that can transmit/receive information with each unit (for example, it is a management server 120) of the battery management system 100 via a communication network 10, and its detail is not particularly limited. Examples of the communication terminal 32 may include a personal computer, a mobile terminal, and the like. Examples of the mobile terminal may include a mobile phone, a smartphone, a PDA, a tablet, a notebook computer or a laptop computer, a wearable computer, and the like.

In the present embodiment, the electric motorcycle 34 consumes electric power supplied by batteries 20. More specifically, the electric motorcycle 34 moves by using electric power supplied by batteries 20. When a battery 20 has a storage device, the electric motorcycle 34 may store at least one of the driving history and operation history of the electric motorcycle 34 in the above-described storage device.

In the present embodiment, the management server 120 manages the usage of each of one or more batteries 20. For example, the battery management system 100 manages lending states (for example, it is capable of lending, unable to lend, during lending, or the like), operational state (for example, it is charging, discharging, waiting, or the like), charging state (for example, it is a current SOC), storage state (for example, it is temperature, humidity, or the like), deterioration state, or the like of each of one or more batteries 20.

In the present embodiment, the management server 120 may manage the usage of each of one or more battery stations 140. For example, the management server 120 monitors the supply-and-demand state of each of one or more battery stations 140. If the supply-and-demand of a battery 20 is expected to be tight in at least one battery station 140 or if the supply-and-demand of a battery 20 is actually tight in at least one battery station 140, the management server 120 may guide one or more users 30 so that the supply-and-demand balance of a battery 20 in the above-described battery station 140 improves.

The management server 120 may select, as a target of guiding processing described above, at least some of the users 30 whose relevance with a battery station 140 whose supply-and-demand of a battery 20 is expected to be tight or a battery station 140 whose supply-and-demand of a battery 20 is actually tight (as a generic term for these, the terms a battery station 140 for which supply-and-demand is tight or a battery station 140 whose supply-and-demand is tight may be used) is beyond a predefined level. Examples of the user 30 whose relevance with a battery station 140 whose supply-and-demand is tight is beyond a predefined level include (i) a user 30 whose usage frequency of the above-described battery station 140 is greater than a predefined value, (ii) a user 30 whose distance from the above-described battery station 140 is smaller than a predefined value, and whose usage frequency of a battery station 140 whose supply-and-demand is loose during a period when supply-and-demand of the above-described battery station 140 is tight is greater than a predefined value, (iii) a user 30 whose remaining capacity of the battery 20 currently used is sufficient and who can make the replacement period of the battery 20 earlier by a few hours or postpone it by a few hours, (iv) a user 30 whose schedule has an adequate margin of time and who can make the replacement period of the battery 20 earlier by a few hours or postpone it by a few hours, or the like.

In an embodiment, the management server 120 guides one or more users 30 so that the usage of a battery station 140 whose supply-and-demand is tight is suppressed. In another embodiment, the management server 120 may guide one or more users 30 so that the usage of a battery station 140 whose supply-and-demand of a battery 20 is loose is accelerated.

For example, in a time period P1, if the supply-and-demand of a battery station A is tight, the management server 120 guides a user 30 who is likely to use a battery station A during the time period P1 so that the above-described user 30 uses any battery stations 140 (for example, it is the battery station A or a battery station B) during a time period P2 different from the time period P1. This reduces the number of users 30 who use the battery station 140 during the time period P1.

In the time period P1, if the supply-and-demand of a battery station A is tight, the management server 120 may guide a user 30 who is likely to use the battery station A during the time period P1 so that the above-described user 30 uses the battery station B different from the battery station A. This reduces the number of users 30 who use the battery station 140 during the time period P1.

In the time period P1, if the supply-and-demand of a battery station A is tight, the management server 120 may guide a user 30 who is likely to use the battery station B during the time period P1 so that the above-described user 30 uses the battery station B during the time period P1. This suppresses an increase in the number of users 30 who use the battery station 140 during the time period P1.

In the time period P1, if the supply-and-demand of a battery station A is tight, the management server 120 may guide a user 30 who is likely to use any battery stations 140 (for example, it is the battery station A or the battery station B) during the time period P2 so that the above-described user 30 uses the battery station 140 during a time period P2. The detail of the management server 120 will be described below.

This suppresses an increase in the number of users 30 who use the battery station 140 during the time period P1. Also, for example, even if a user 30 cannot reserve lending of a battery 20 accommodated in a battery station 140, or even if a period when a battery 20 become possible to be lent out by the battery station 140 cannot be expected, a user 30 can avoid using a battery station 140 whose supply-and-demand is expected to be tight and can avoid using a battery station 140 during a time frame when supply-and-demand is expected to be tight.

In the present embodiment, a battery station 140 holds one or more batteries 20. The battery station 140 charges each of one or more batteries 20. In the present embodiment, the battery station 140 performs lending processing of a battery 20 in response to a request from a user 30. For example, authentication processing of a user 30, a withdrawal processing of a battery 20, or the like are performed. The detail of a battery station 140 will be described below.

A battery 20 may be an example of a power storage device. A user 30 may be an example of a user, a first user, and a second user. A user 30 who is likely to use a battery station A in a time period P1 may be an example of a first user. The battery management system 100 may be an example of an information processing device. The management server 120 may be an example of the information processing device. The battery station 140 may be an example of a storage apparatus. Lending of a battery 20 may be an example of an embodiment of providing a battery 20 by the battery management system 100.

In the present embodiment, using, as an example, a case where a battery 20 is used as an electronic power source for an electric motorcycle 34, the detail of the battery management system 100 has been described. However, applications of a battery 20 are not limited to the present embodiment. In another embodiment, a battery 20 may be used as an electronic power source for various kinds of electrical equipment. The above-described electrical equipment may be movable bodies whose power source is an electric motor, or may be a stationary power storage device.

Examples of a movable body may include an automobile, a motorcycle, a vehicle for riding while standing up with a power unit, a marine vessel, a flight vehicle, and the like. Examples of an automobile may include a gasoline automobile, a diesel car, an electric automobile, a fuel cell vehicle, a hybrid car, a small commuter, electric automobile, an electric cart, and the like. Examples of a motorcycle may include a motorbike, a three-wheeler, a power-assisted bicycle, and the like. Examples of the marine vessel may include a ship, a hovercraft, a personal watercraft, a submarine, a submersible vessel, an underwater propulsion vehicle, and the like. Examples of the flight vehicle may include an airplane, an airship or an air ball, a balloon, a helicopter, a drone, and the like.

In the present embodiment, using, as an example, a case where a management server 120 manages one or more batteries 20 and one or more battery stations 140, the detail of the battery management system 100 has been described. However, the battery management system 100 is not limited to the present embodiment. In another embodiment, at least one of one or more battery stations 140 may have at least some of functions of the above-mentioned management server 120. For example, at least one of one or more battery stations 140 manages one or more batteries 20. At least one of one or more battery stations 140 may manage another battery station 140. In this case, the battery management system 100 may or may not comprise a management server 120.

In the present embodiment, using, as an example, a case where a user 30 requests for lending of a battery 20 after an electric motorcycle 34 arrives at a battery station 140, the detail of the battery management system 100 has been described. However, the battery management system 100 is not limited to the present embodiment. In another embodiment, a battery management system 100 may accept a reservation related to lending of a battery 20. A management server 120 may manage the above-described reservation. All the batteries 20 that are managed by the management server 120 may be subject to a reservation or some of the batteries 20 may be subject to a reservation.

For example, the management server 120 manages, for at least some of one or more battery stations 140, conditions related to the number or a ratio of batteries 20 that are subject or are not subject to the above-described reservation in each of battery stations 140. The above-described ratio may be determined on the basis of a current value or a maximum value of the number of batteries 20 stored by each of battery stations 140.

In the case where all the batteries 20 accommodated in a battery station 140 are subject to a reservation, when a user 30 arrives at a specific battery station 140, all the batteries 20 accommodated in the specific battery station 140 may be reserved by another user 30 and the above-described user 30 may not be able to receive a battery 20. On the other hand, according to the above-described embodiment, compared to a case where all the batteries 20 are subject to a reservation, a probability that a user 30 is able to receive a battery 20 when arriving at a specific battery station 140 increases.

A condition related to the number or a ratio of batteries 20 that are not subject to the above-described reservation may be a condition related to a lower limit value of the number or a ratio of batteries 20 that are not subject to the above-described reservation. Examples of the above-described condition may include (i) a condition that the number of batteries 20 that are not subject to a reservation is Nmin or more, or is greater than Nmin, (ii) a condition that a ratio of the number of batteries 20 that are not subject to a reservation to the number of batteries 20 that can be accommodated in a battery station 140 is Rmin or more, or is greater than Rmin, and the like. Nmin may be an integer of one or greater and Rmin may be a number which is greater than 0 and smaller than 1.

A condition related to the number or a ratio of batteries 20 that are subject to the above-described reservation may be a condition related to a upper limit value of the number or a ratio of batteries 20 that are subject to the above-described reservation. Examples of the above-described condition may include (i) a condition that the number of batteries 20 that are subject to a reservation is Nmax or fewer, or is smaller than Nmax, (ii) a condition that a ratio of the number of batteries 20 that are subject to a reservation to the number of batteries 20 that can be accommodated in a battery station 140 is Rmax or fewer, or is smaller than Rmax, and the like. Nmax may be an integer of one or greater and Rmax may be a number which is greater than 0 and smaller than 1.

The management server 120 may manage a plurality of battery stations 140 as one group. The management server 120 may categorize a plurality of battery stations 140 into a plurality of groups based on the installed locations of each of a plurality of battery stations 140. For example, by a similar procedure to the above-mentioned embodiment, the management server 120 manages, for at least some of a plurality of battery stations 140 included in each group, conditions related to the number or a ratio of batteries 20 that are subject or are not subject to the above-described reservation in respective battery stations 140. Thereby, both the improvement of convenience in that a user 30 can reserve a battery 20 ahead of time and the improvement of convenience in that a user 30 receives a battery 20 without making a reservation can be realized at the same time.

(A Specific Configuration of Each Unit of a Battery Management System 100)

Each unit of the battery management system 100 may be realized by hardware, software, or a combination of hardware and software. When at least some of components of the battery management system 100 are realized by a software, components realized by the software may be realized by launching a program that defines the operations related to the components in an information processing device with a general configuration.

The program may be stored on a computer-readable medium such as a CD-ROM, a DVD-ROM, a memory, a hard disk, or may be stored on a storage device connected to a network. The program may be installed from a computer-readable medium or a storage device connected to a network to a computer that constitutes at least a part of the battery management system 100. Execution of the program may cause a computer to function as at least a part of each unit of the battery management system 100.

The program causing the computer to function as at least a part of each unit of the battery management system 100 may include modules that define the operations of each unit of the battery management system 100. The program or modules act on a data processing device, an input apparatus, an output apparatus, storage device, and the like to cause the computer to function as each unit of the battery management system 100 and to perform the information processing method of each unit of the battery management system 100.

The information processes written in the program function as a specific means realized by the cooperation of software related to the program and various hardware resources of the battery management system 100, by having the program read by the computer. The realization of the calculations or manipulations of information appropriate for the intended use of the computer of the present embodiment by the above-described specific means allows a battery management system 100 according to the intended use to be configured.

An information processing method in each unit of the battery management system 100 has, for example, predicting a first user who uses a storage apparatus that stores a power storage device in a first time period subsequent to a current time point. An information processing method in each unit of the battery management system 100 has, for example, reporting information related to the usage of a storage apparatus in a first time period, to a user of the storage apparatus that stores a power storage device, whose probability of using the storage apparatus in a first time period subsequent to a current time point is greater than a predefined threshold.

Figure 2:
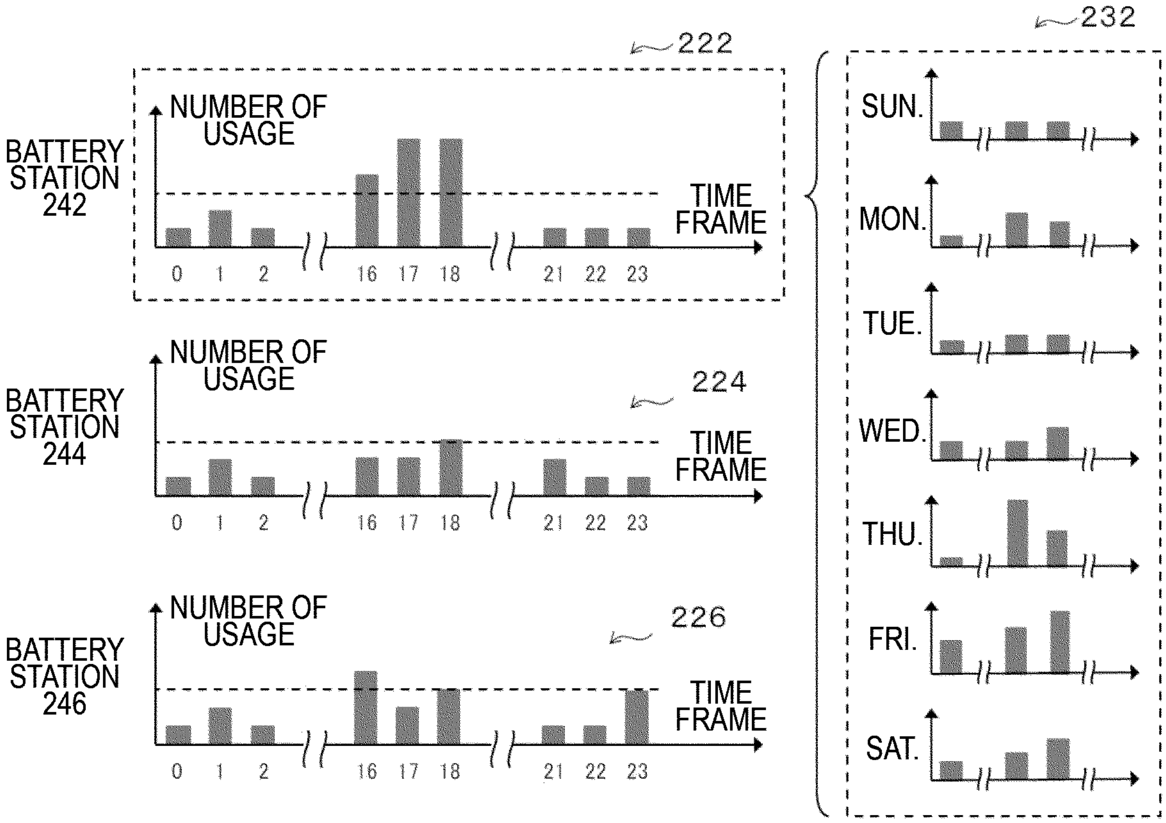
FIG. 2 schematically shows an example of the usage of battery stations 140.

FIG. 2 schematically shows an example of the usage of battery stations 140. In FIG. 2, a histogram 222 shows a frequency distribution of the number of usage of battery stations 242 for each time frame in a specific time period. A histogram 224 shows a frequency distribution of the number of usage of battery stations 244 for each time frame in the above-described time period. A histogram 226 shows a frequency distribution of the number of usage of battery stations 246 for each time frame in the above-described time period. A histogram 232 shows a frequency distribution of the number of usage of battery stations 242 for each day of the week in the above-described time period.

As shown in FIG. 2, tightness of the supply-and-demand of batteries 20 during a specific time period can be different for each battery station 140. Also, a period when the supply-and-demand of batteries 20 is tight (it may be referred to as a high season) can be different for each battery station 140. Similarly, a period whose supply-and-demand of batteries 20 is loose (it may be referred to as a low season) can be different for each battery station 140.

Furthermore, at least a part of a high season of one battery station 140 and at least a part of a high season of another battery station 140 may overlap with each other. At least a part of a low season of one battery station 140 and at least a part of a low season of another battery station 140 may overlap with each other. At least a part of a high season of one battery station 140 and at least a part of a low season of another battery station 140 may overlap with each other.

Figure 3:
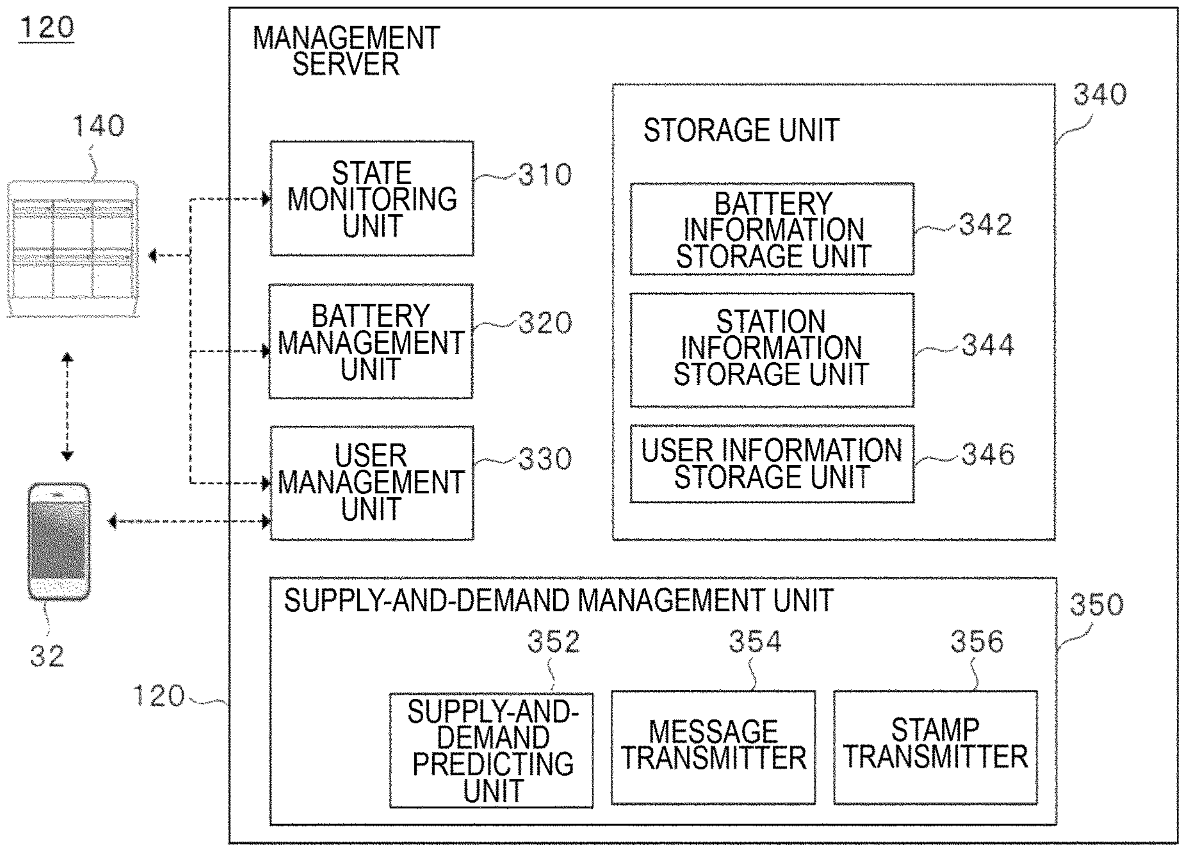
FIG. 3 schematically shows an example of a system configuration of a management server 120.

FIG. 3 schematically shows an example of a system configuration of a management server 120. As shown in FIG. 3, in the present embodiment, the management server 120 comprises, for example, a state monitoring unit 310, a battery management unit 320, a user management unit 330, and a storage unit 340. In the present embodiment, the storage unit 340 has, for example, a battery information storage unit 342, a station information storage unit 344, and a user information storage unit 346. Also, in the present embodiment, the management server 120 comprises a supply-and-demand management unit 350. In the present embodiment, the supply-and-demand management unit 350 has, for example, a supply-and-demand predicting unit 352, a message transmitter 354, and a stamp transmitter 356. Each unit of the management server 120 may transmit/receive information with each other.

In the present embodiment, the state monitoring unit 310 monitors each of battery stations 140 that are subject to being managed. The state monitoring unit 310 acquires information related to at least one of working state and operational state of a battery station 140 from each of battery stations 140 that are subject to being managed. For example, the state monitoring unit 310 acquires information that indicates a usage rate of a battery station 140, from each of battery stations 140 that are subject to being managed. The state monitoring unit 310 may acquire information that indicates whether there is an abnormality in a battery station 140, from each of battery stations 140 that are subject to being managed. The state monitoring unit 310 may acquire information that indicates stopping of a battery station 140 or a stopping schedule of a battery station 140, from each of battery stations 140 that are subject to being managed.

In the present embodiment, the state monitoring unit 310 monitors each of batteries 20 that are subject to being managed. For example, the state monitoring unit 310 acquires information related to at least one of an operational state, a charging state, a storage state, and a deterioration state of a battery 20 stored in a battery station 140, from each of battery stations 140 that are subject to being managed.

The state monitoring unit 310 acquires, for example, information that indicates power amount that each of one or more batteries 20 held by a battery station 140 accumulated. The state monitoring unit 310 may acquire information that indicates a respective SOC of the above-described one or more batteries 20.

In the present embodiment, the battery management unit 320 manages the usage of one or more batteries 20. The battery management unit 320 manages, for example, at least one of an operational state, a charging state, a storage state, and a deterioration state of a battery 20 that is subject to being managed.

The battery management unit 320 may manage a charging schedule of one or more batteries 20. The battery management unit 320 may manage a charging schedule of batteries 20 for each of battery stations 140. The charging schedule may be information that associates information that indicates a time and information that indicates the number of batteries 20 whose charging will be completed by the time so that they can be lent out. Charging may be determined to be completed when a charging rate is 100% and may be determined to be completed when a charging rate is greater than a predefined value.

In the present embodiment, the user management unit 330 manages various kinds of information related to a user 30. The user management unit 330 may associate various kinds of information with identification information of a user 30 so as to store them in the user information storage unit 346.

The user management unit 330 may manage, for each of battery stations 140, a user 30 who used the battery station during a specific time period. The user management unit 330 may manage the above-described user 30 for each day of the week or for each time frame. The above-described specific time period may be any year, may be any month, may be any week, or may be any date.

The user management unit 330 may manage, for each of battery stations 140, a cumulative total of users 30 who used the battery station during a specific time period. The above-described cumulative total of users 30 may be managed for each day of the week or for each time frame. The above-described specific time period may be any year, may be any month, may be any week, or may be any date.

The user management unit 330 may manage, for each of one or more users 30, the usage of battery stations 140. For example, each time each user uses a battery station 140, the user management unit 330 associates information that indicates a date and time when the user used the battery station 140 with identification information of the above-described battery station 140 so as to store them in the user information storage unit 346.

The user management unit 330 may manage, for each of one or more users 30, statistics of interval that the user uses any one of one or more battery stations 140. The user management unit 330 may manage, for each of one or more users 30, statistics of interval that the user uses a specific battery station 140. Examples of statistics may include a mean value, a mode, a percentile, a range, a distribution, an unbiased variance, a standard deviation, a skewness, a kurtosis, and the like. Examples of percentiles may include a first quartile (a 25th percentile), a median (a 50th percentile), a third quartile (a 75th percentile), and the like.

The user management unit 330 may monitor a state of a user 30. For example, the state monitoring unit 310 acquire various kinds of information related to a user 30 from a communication terminal 32. The state monitoring unit 310 may acquire location information that indicates a location of a communication terminal 32 from the communication terminal 32. The state monitoring unit 310 may acquire information that indicates a movement history of a communication terminal 32 from the communication terminal 32. In this case, a movement history may be represented by locations indicated by GPS signals and by a time when the GPS signals are received. The state monitoring unit 310 may acquire information related to a movement history of a user 30 stored in the memory of a battery 20 that is subject to being managed, from each of battery stations 140 that are subject to being managed.

In the present embodiment, the storage unit 340 stores various kinds of information. The storage unit 340 may store information that the state monitoring unit 310, the battery management unit 320, or the user management unit 330 generated or acquired.

In the present embodiment, the battery information storage unit 342 stores various kinds of information related to each of batteries 20 that are subject to being managed. In an embodiment, the battery information storage unit 342, for each battery, stores information that indicates power amount accumulated by the battery. Information that indicates power amount accumulated by the above-described battery may be a value of a SOC of the battery. In another embodiment, the battery information storage unit 342, for each battery, stores information that indicates progress level of deterioration of the battery. Information that indicates progress level of deterioration of the above-described battery may be a value of any indices that indicates deterioration state of the battery.

In the present embodiment, the station information storage unit 344 stores various kinds of information related to each of battery stations 140 that are subject to being managed. For example, the station information storage unit 344 stores, for each battery station, respective identification information of one or more batteries 20 that the battery station holds.

In the present embodiment, the user information storage unit 346 stores various kinds of information related to a user 30. For example, the user information storage unit 346 stores, for each user 30, information that the user management unit 330 generated or updated.

In the present embodiment, the supply-and-demand management unit 350 manages the supply-and-demand of a battery 20 in each of one or more battery stations 140. For example, if the supply-and-demand of a battery 20 is expected to be tight in at least one battery station 140 or if the supply-and-demand of a battery 20 is actually tight in at least one battery station 140, the supply-and-demand management unit 350 guides one or more users 30 so that the supply-and-demand balance of a battery 20 in the above-described battery station 140 improves.

In the present embodiment, the supply-and-demand predicting unit 352 predicts the supply-and-demand of a battery 20 in each of one or more battery stations 140. For example, the supply-and-demand predicting unit 352 predicts, in any future time period (it may be referred to as a first time period), a user 30 who uses a battery station 140. The above-described first time period may be a time period subsequent to a current time point (i.e., a time point when the supply-and-demand predicting unit 352 performs a prediction).

For example, the supply-and-demand predicting unit 352 predicts, in a high season of a specific battery station 140 (for example, it is a battery station A), a user 30 who uses a battery station A. The supply-and-demand predicting unit 352 may predict, in a high season of the battery station A, a user who uses a battery station 140 that is different from the battery station A (for example, it is a battery station B). Furthermore, the supply-and-demand predicting unit 352 may predict, in a low season of the battery station A, a user 30 who uses any one of one or more battery stations 140 (for example, it is a battery station A or a battery station B).

(A First Specific Example of a Method to Predict a User 30)

In an embodiment, the supply-and-demand predicting unit 352 acquires information that indicates a usage history (it may be referred to as usage information) of one or more users 30 who used one or more battery stations 140 in the time period prior to a first time period (it may be referred to as a second time period). For example, the supply-and-demand predicting unit 352 accesses the user information storage unit 346 so as to acquire the above-described usage information. A second time period may be any time periods in the past. The supply-and-demand predicting unit 352 predicts a user 30 who uses at least some of one or more battery stations 140 in a first time period, based on a usage history indicated by usage information.

The supply-and-demand predicting unit 352 may predict a user 30 who uses a specific battery station 140 in a first time period, based on usage information of one or more users 30 who used the specific battery station 140 in a second time period. The supply-and-demand predicting unit 352 may predict a user 30 who uses a specific battery station 140 in a first time period, based on usage information of one or more users 30 who used a plurality of battery stations 140 in a second time period.

(A Case where Usage Information Includes Information Related to Time Frames)

In the present embodiment, usage information includes information related to a time frame when each user used a battery station 140 in a second time period. In this case, the supply-and-demand predicting unit 352 predicts that at least some of the users 30 who used, in the second time period, a specific battery station 140 during a time frame to which a first time period belongs use the specific battery station 140 in the first time period.

For example, when the first time period is from 16:00 to 19:00 on Nov. 1, 2019 and the second time period is from Oct. 1, 2019 to Oct. 31, 2019, the supply-and-demand predicting unit 352 predicts that at least some of the users 30 who used the above-described specific battery station 140 between 16:00 and 19:00 from Oct. 1, 2019 to Oct. 31, 2019, use the specific battery station 140 between 16:00 and 19:00 on Nov. 1, 2019.

Furthermore, a time period of a time frame to which a first time period belongs may be identical to a time period of a time frame of the first time period or may be a longer time period than a time frame of the first time period. For example, a time frame of the first time period may be from 17:00 to 18:00 and a time frame to which the first time period belongs may be from 16:00 to 19:00.

More specifically, the supply-and-demand predicting unit 352 extracts based on usage information, a user 30 whose number of times or frequency of having used, in a second time period, a specific battery station 140 during a time frame to which a first time period belongs satisfies a first extraction condition. The supply-and-demand predicting unit 352 selects, out of the extracted users 30, a user 30 who satisfies a first selection condition as a user 30 who uses the above-described specific battery station 140 in a first time period.

A first extraction condition may include a condition that the number of times or frequency of using, in a second time period, a specific battery station 140 during a time frame to which a first time period belongs is greater than a predefined lower limit value. The first extraction condition may include a condition that the number of times or frequency of using, in the second time period, a specific battery station 140 during a time frame to which a first time period belongs is smaller than a predefined upper limit value. The first extraction condition may include a condition into which these conditions are combined.

The first selection condition may include a condition related to an interval of using any one of one or more battery stations 140. The first selection condition may include a condition that statistics of intervals of using any one of one or more battery stations 140 is greater than a predefined lower limit value. The first selection condition may include a condition that statistics of intervals of using any one of one or more battery stations 140 is smaller than a predefined upper limit value. The first selection condition may include a condition into which these conditions are combined.

The first selection condition may include a condition related to a length of the elapsed time period since a time of using any one of one or more battery stations 140 last. The first selection condition may include a condition that a length of the elapsed time period since a time of using any one of one or more battery stations 140 last is greater than a first threshold. Thereby, for example, if a time period between a period predicted by the supply-and-demand predicting unit 352 and a start of a first time period is relatively short, the supply-and-demand predicting unit 352 can exclude, from prediction targets, a user 30 who replaced a battery 20 during the most recent period of the above-described predicted period. As a result, the prediction accuracy improves.

The first selection condition may include a condition that a length of the elapsed time period since a time of using any one of one or more battery stations 140 last is smaller than a first threshold. Thereby, for example, if a time period between a period predicted by the supply-and-demand predicting unit 352 and a start of a first time period is relatively long, the supply-and-demand predicting unit 352 can exclude, from prediction targets, a user 30 who is likely to replace a battery 20 during the most recent period of the above-described predicted period.

In a case where the first selection condition includes a condition that the length of the above-described elapsed time period is smaller than the first threshold, for example, if the first threshold is a value defined based on statistics of interval of using a battery station 140 (for example, if statistic is a 25th percentile value), the supply-and-demand predicting unit 352 can predict a user 30 who is likely not to have replaced a battery 20 right before the start of the first time period, or a user 30 who is likely to replace a battery 20 during the time period of the above-described first time period. Similarly, the supply-and-demand predicting unit 352 can predict a user 30 who is likely to replace a battery 20 during the period closest to the above-described start of the first time period (i.e., a user 30 who is not likely to replace a battery 20 during the time period of the above-described first time period). As a result, the prediction accuracy can improve.

A first threshold may be any numerical value that is not dependent on a user 30, or may be a numerical value defined for each of users 30. For example, the first threshold is defined based on usage history by a user 30 of any one of one or more battery stations 140 in a second time period. The first threshold may be defined based on statistics of intervals that each user used a battery station 140 in the second time period. The first selection condition may include a condition into which at least two of the above-described plurality of conditions are combined.

Furthermore, the first selection condition is not limited to the above-described embodiment. In another embodiment, the first selection condition may include a condition related to a remaining capacity of the battery 20 currently used. The first selection condition may include a condition that the above-described remaining capacity is greater than a predefined lower limit value. The first selection condition may include a condition that the above-described remaining capacity is smaller than a predefined upper limit value. The first selection condition may include a condition into which these conditions are combined.

In another embodiment, a first selection condition may include a condition related to a length of time period between an end of a final schedule of a user 30 in a time period prior to a first time period and a start of a first time period. The first selection condition may include a condition that the above-described length of time period is greater than a predefined lower limit value. The first selection condition may include a condition that the above-described length of time period is smaller than a predefined upper limit value. The first selection condition may include a condition into which these conditions are combined.

In another embodiment, a first selection condition may include a condition related to a length of time period between an end of a first time period and a start of an initial schedule of a user 30 in a time period subsequent to a first time period. The first selection condition may include a condition that the above-described length of time period is greater than a predefined lower limit value. The first selection condition may include a condition that the above-described length of time period is smaller than a predefined upper limit value. The first selection condition may include a condition into which these conditions are combined.

(A Case where Usage Information Includes Information Related to a Day of the Week)

In the present embodiment, usage information includes information related to a day of the week when each user used a battery station 140 in a second time period. In this case, the supply-and-demand predicting unit 352 predicts that at least some of the users 30 who used, in the second time period, a specific battery station 140 on a day of the week to which a first time period belongs use the specific battery station 140 in the first time period.

For example, when the first time period is from 17:00 to 18:00 on Nov. 1, 2019 (Friday) and the second time period is from Oct. 1, 2019 to Oct. 31, 2019, the supply-and-demand predicting unit 352 predicts that at least some of the users 30 who used the above-described specific battery station 140 on Fridays from Oct. 1, 2019 to Oct. 31, 2019, use the specific battery station 140 between 17:00 and 18:00 on Nov. 1, 2019. Furthermore, the length of the first time period may be shorter than one day, may be one day or shorter, or may exceed one day.

More specifically, the supply-and-demand predicting unit 352 extracts based on usage information, a user 30 whose number of times or frequency of having used, in a second time period, a specific battery station 140 on a day of the week to which a first time period belongs satisfies a second extraction condition. The supply-and-demand predicting unit 352 selects, out of the extracted users 30, a user 30 who satisfies a second selection condition as a user 30 who uses the above-described specific battery station 140 in a first time period.

A second extraction condition may include a condition that the number of times or frequency of using, in a second time period, a specific battery station 140 on a day of the week to which a first time period belongs is greater than a predefined lower limit value. A second extraction condition may include a condition that the number of times or frequency of using, in the second time period, a specific battery station 140 on a day of the week to which a first time period belongs is smaller than a predefined upper limit value. The second extraction condition may include a condition into which these conditions are combined.

The second selection condition may include a condition related to a length of the elapsed time period since a time of using any one of one or more battery stations 140 last. The second selection condition may include a condition that a length of the elapsed time period since a time of using any one of one or more battery stations 140 last is greater than a second threshold. The second selection condition may include a condition that a length of the elapsed time period since a time of using any one of one or more battery stations 140 last is smaller than a second threshold. The second selection condition may include a condition into which these conditions are combined.

A second threshold may be any numerical value that is not dependent on a user 30, or may be a numerical value defined for each of users 30. For example, the second threshold is defined based on usage history by a user 30 of any one of one or more battery stations 140 in a second time period. The second threshold may be defined based on statistics of intervals that each user used a battery station 140 in the second time period.

Furthermore, the second selection condition is not limited to the above-described embodiment. In another embodiment, the second selection condition may include a condition related to a remaining capacity of the battery 20 currently used. The second selection condition may include a condition that the above-described remaining capacity is greater than a predefined lower limit value. The second selection condition may include a condition that the above-described remaining capacity is smaller than a predefined upper limit value. The second selection condition may include a condition into which these conditions are combined.

In another embodiment, a second selection condition may include a condition related to a length of time period between an end of a final schedule of a user 30 in a time period prior to a first time period and a start of a first time period. The second selection condition may include a condition that the above-described length of time period is greater than a predefined lower limit value. The second selection condition may include a condition that the above-described length of time period is smaller than a predefined upper limit value. The second selection condition may include a condition into which these conditions are combined.

In another embodiment, a second selection condition may include a condition related to a length of time period between an end of a first time period and a start of an initial schedule of a user 30 in a time period subsequent to a first time period. The second selection condition may include a condition that the above-described length of time period is greater than a predefined lower limit value. The second selection condition may include a condition that the above-described length of time period is smaller than a predefined upper limit value. The second selection condition may include a condition into which these conditions are combined.

(A Second Specific Example of a Method to Predict a User 30)

In another embodiment, the supply-and-demand predicting unit 352 predicts whether a user 30 uses a specific battery station 140 in a first time period, based on a length of the elapsed time period since a time when the above-described user 30 who used the specific battery station 140 in a second time period used any one of one or more battery stations 140 last. For example, the supply-and-demand predicting unit 352 predicts that at least some of the users 30 with the above-described length of elapsed time period that is greater than a third threshold, use the specific battery station 140 in the first time period. The supply-and-demand predicting unit 352 may predict that at least some of the users 30 with the above-described length of elapsed time period that is smaller than the third threshold, use the specific battery station 140 in the first time period.

A third threshold may be any numerical value that is not dependent on a user 30, or may be a numerical value defined for each of users 30. For example, the third threshold is defined based on usage history by a user 30 of any one of one or more battery stations 140 in a second time period. The third threshold may be defined based on statistics of intervals that each user used a battery station 140 in the second time period.

(Other Specific Examples of Methods to Predict a User 30)

Furthermore, methods to predict a user 30 are not limited to the above-described specific examples. In another embodiment, a supply-and-demand predicting unit 352 predicts a user 30 who uses a specific 140 in a first time period, based on statistics of intervals that each user used a battery station 140 in a second time period. In another embodiment, the supply-and-demand predicting unit 352 predicts a user 30 who uses a specific 140 in a first time period, based on a remaining capacity of the battery 20 currently used. In another embodiment, the supply-and-demand predicting unit 352 predicts a user 30 who uses a specific 140 in a first time period, based on a schedule of each user. The supply-and-demand predicting unit 352 may combine the above-mentioned various kinds of embodiments so as to predict a user 30 who uses a specific 140 in the first time period.

In the present embodiment, the message transmitter 354 reports messages related to the usage of a battery station 140 in the first time period, to a user 30 whose probability of using a battery station 140 in the first time period is greater than a predefined threshold. The message transmitter 354 may report messages related to the usage of a battery station 140 in the first time period, to a communication terminal 32 of the above-described user 30. For example, the message transmitter 354 transmits the above-described message to a communication terminal 32 of a user 30 predicted by the supply-and-demand predicting unit 352. The message transmitter 354 may transmit the above-described message in a predefined time period prior to a start of a first time period.

The above-described message may include information that indicates supply-and-demand situations of a specific battery station 140. The above-described message may include information that indicates supply-and-demand situations of a battery station 140 arranged near the above-described specific battery station 140. The above-described message may include information that indicates details of actions expected of a user 30. The above-described message may include information that indicates details of incentives for actions expected of a user 30.

In the present embodiment, the stamp transmitter 356 transmits data of stamps to a battery station 140. The stamp functions as the above-described incentive.

The stamp transmitter 356 may determine a type of stamp to be transmitted to a battery station 140 so that a value of the stamp provided to a user 30 who used a battery station 140 whose supply-and-demand is loose in a time period designated by the management server 120, is greater than a value of a stamp provided to a user 30 who used a battery station 140 whose supply-and-demand is tight in the time period designated by the management server 120. The stamp transmitter 356 may determine a type of stamp to be transmitted to a battery station 140 so that a value of the stamp provided to a user 30 who used any one of one or more battery stations 140 in a time period designated by the management server 120, is greater than a value of a stamp provided to a user 30 who used a battery station 140 in a time period except for the above-described time period.

The supply-and-demand management unit 350 may be an example of an information processing device. The supply-and-demand predicting unit 352 may be an example of a prediction unit, a first extracting unit, a first selector, a second extracting unit, and a second selector. The message transmitter 354 may be an example of a reporting unit. The stamp transmitter 356 may be an example of a reporting unit.

A user 30 who uses a battery station 140 in a first time period may be an example of a first user. A user 30 who used a battery station 140 in a second time period may be an example of a second user. Furthermore, a first user and a second user may be an identical user 30 or may be different users 30. A high season of a battery station A may be an example of a first time period. A user 30 who uses the battery station A in the high season of the battery station A may be an example of a first user. A low season of the battery station A may be an example of a first time period. A user 30 who uses any one of one or more battery stations in the low season of the battery station A may be an example of a first user.

A message may be an example of information related to the usage of a storage apparatus in a first time period. A stamp may be an example of information related to the usage of the storage apparatus in the first time period.

In the present embodiment, using, as an example, a case where a stamp is used as an incentive for actions expected of a user 30, the detail of the battery management system 100 has been described. However, the incentive is not limited to stamps. In another embodiment, any electronic value may be used as an incentive. Examples of electronic values may include points, items in a game, and the like.

Figure 4:
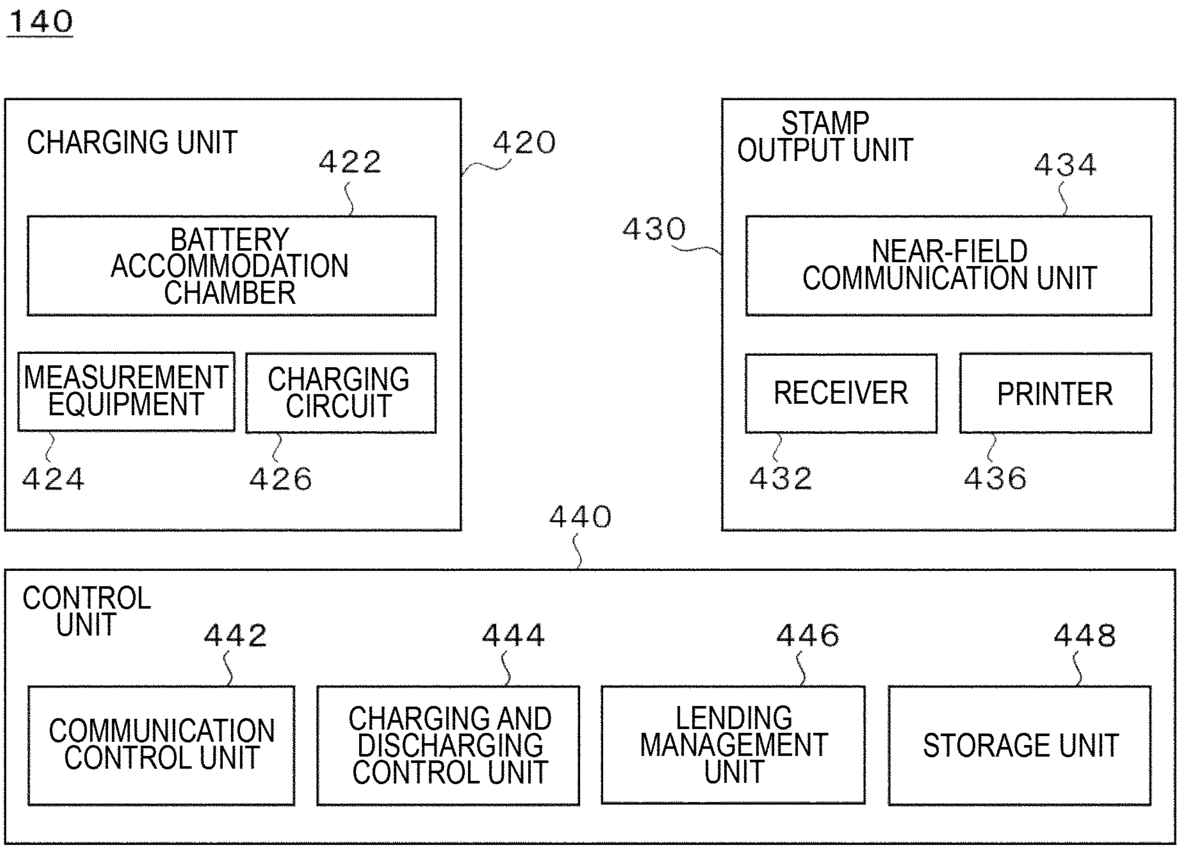
FIG. 4 schematically shows an example of a system configuration of a battery station 140.

FIG. 4 schematically shows an example of a system configuration of a battery station 140. In the present embodiment, the battery station 140 comprises one or more charging unit 420, a stamp output unit 430, and a control unit 440. In the present embodiment, each of one or more charging units 420 has a battery accommodation chamber 422, a piece of measurement equipment 424, and a charging circuit 426. In the present embodiment, the stamp output unit 430 has a receiver 432, a near-field communication unit 434, and a printer 436. In the present embodiment, the control unit 440 has a communication control unit 442, a charging and discharging control unit 444, a lending management unit 446, and a storage unit 448.

In the present embodiment, a charging unit 420 charges a battery 20. A single charging unit 420 may charge a single battery 20, or a single charging unit 420 may charge a plurality of batteries 20.

In the present embodiment, the battery accommodation chamber 422 accommodates a battery 20. In the present embodiment, the measurement equipment 424 measures various kinds of physical quantities related to the battery 20 accommodated in the battery accommodation chamber 422. The measurement equipment 424 may transmit information that indicates measurement results to the control unit 440. For example, the measurement equipment 424 measures the voltage of the above-described battery 20. The measurement equipment 424 may measure at least one of charging current and discharging current of the above-described battery 20. In the present embodiment, the charging circuit 426 supplies electric power to a battery 20, so as to charge the battery 20. The charging circuit 426 may charge a battery 20 according to an instruction from the control unit 440.

The stamp output unit 430 outputs a stamp in response to a request from a user 30. Although embodiments of outputting a stamp are not particularly limited, in the present embodiment, the stamp output unit 430 outputs it as electronic data, an image, or a 3D object.

In the present embodiment, the receiver 432 acquires data of a stamp from the management server 120. The receiver 432 may transmit data of a stamp to at least one of the near-field communication unit 434 and the printer 436.

In the present embodiment, the near-field communication unit 434 outputs a stamp in response to a request from a user 30. The near-field communication unit 434 may transmit data of stamps received by the receiver 432 to a communication terminal 32 of a user 30. Furthermore, the near-field communication unit 434 may select any data or specific data out of data of stamps prestored by a battery station 140 and may transmit the selected data to the communication terminal 32 of the user 30.

In the present embodiment, the printer 436 outputs a stamp in response to a request from a user 30. The printer 436 may output a stamp based on data of a stamp received by the receiver 432. The printer 436 may be a 2D printer that outputs a two-dimensional image or may be a 3D printer that outputs a 3D object. Furthermore, the printer 436 may select any data or specific data out of data of stamps prestored by a battery station 140 and may output stamps based on the selected data.

In the present embodiment, using, as an example, a case where a near-field communication unit 434 arranged in a battery station 140 transmits data of a stamp to a communication terminal 32 of a user 30 or a case where a printer 436 arranged in a battery station 140 outputs an image of a stamp or the like, the detail of the battery management system 100 has been described. However, embodiments of providing a stamp are not limited to the present embodiment.

In another embodiment, the management server 120 transmits data of a stamp to a communication terminal 32 of a user 30. In this case, the management server 120 may transmit data of a stamp to a communication terminal 32 of a user 30 after confirming that the user 30 used a specific battery station 140. For example, the management server 120 acquires the location information of the communication terminal 32 from the communication terminal 32 of the user 30. If the distance between the location of the communication terminal 32 and a location of a battery station 140 is smaller than a predefined value, the management server 120 determines that the user 30 used the specific battery station 140. The management server 120 may determine that a user 30 used a specific battery station 140, by acquiring, from the battery station 140, information that indicates that the user 30 had used the battery station 140.

In the present embodiment, the control unit 440 controls an operation of a battery station 140. The control unit 440 may control an operation of the battery station 140 by using information acquired from the management server 120. The control unit 440 may control an operation of the battery station 140 based on instructions from the management server 120. The control unit 440 may perform various kinds of information processing methods in a battery station 140.

The control unit 440 may control an operation of lending a battery 20 by the battery station 140. The control unit 440 may determine a battery 20 that is subject to be lent out. The control unit 440 may control an operation of charging a battery 20 by the battery station 140. The control unit 440 may determine a battery 20 that is subject to charging.

In the present embodiment, the communication control unit 442 controls communication between a battery station 140 and external equipment. Examples of a piece of external equipment may include at least one of a battery 20, a communication terminal 32, and a management server 120. The communication control unit 442 may be a communication interface. The communication control unit 442 may support one or more types of communication modes.

In the present embodiment, the charging and discharging control unit 444 controls charging and discharging of a battery 20 by each of one or more charging units 420. For example, the charging and discharging control unit 444 controls the charging of a battery 20 by controlling charging circuits 426. The charging and discharging control unit 444 may control discharging of a battery 20 by controlling discharging circuits (not shown). The charging and discharging control unit 444 controls, for example, a time point of starting charging or discharging of each of one or more batteries 20, a time point of ending the charging or discharging, charging speed, discharging speed, or the like. The charging and discharging control unit 444 may control charging operations of at least some of one or more charging units 420 according to instructions from the lending management unit 446.

In the present embodiment, the lending management unit 446 manages lending of a battery 20 in a battery station 140. The lending management unit 446 may manage the charging of a battery 20 so that the battery 20 is lent out smoothly.

More specifically, the lending management unit 446 may create schedules of charging and discharging for each of one or more batteries 20 held by a battery station 140. For example, the lending management unit 446 determines which battery 20 out of the above-described one or more batteries 20 to charge. The lending management unit 446 may determine which battery 20, by when, to what extent to charge for the above-described one or more batteries 20. The lending management unit 446 may control operations of the charging and discharging control unit 444 according to schedules of charging and discharging.

The lending management unit 446 may manage states of one or more batteries 20 stored in a battery station 140. For example, the lending management unit 446 manages at least one of an operational state, a charging state, a storage state, and a deterioration state of the above-described batteries 20. The lending management unit 446 may manage states of one or more batteries 20 based on measurement results of the measurement equipment 424. The lending management unit 446 may detect abnormalities or deficiencies of batteries 20.

In the present embodiment, the storage unit 448 stores various kinds of information used for controlling a battery station 140. For example, the storage unit 448 associates information that indicates a time with information that indicates measurement results of the measurement equipment 424 in the time so as to store them. The storage unit 448 may store various kinds of information that the communication control unit 442 received from the management server 120. The storage unit 448 may store various kinds of information that the communication control unit 442 received from communication terminals 32.

The stamp output unit 430 may be an example of a reporting unit. The near-field communication unit 434 may be an example of the reporting unit. The printer 436 may be an example of the reporting unit.

Figure 5:
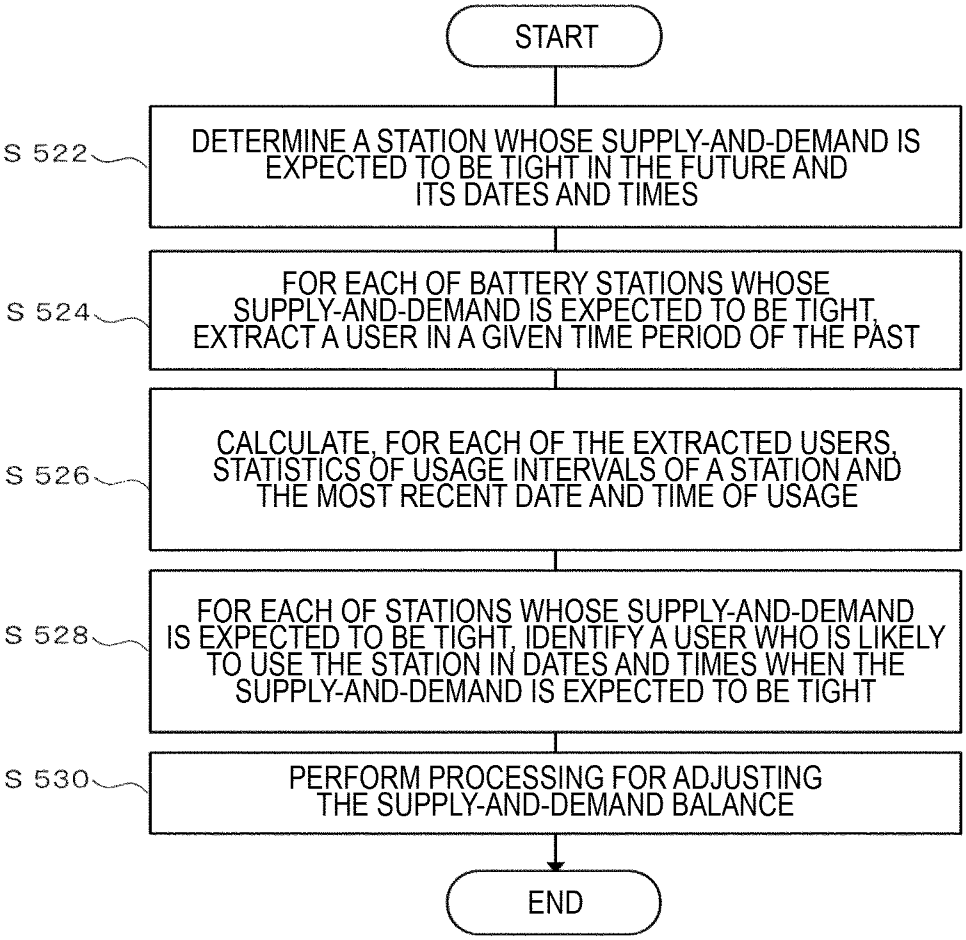
FIG. 5 schematically shows an example of a management method by the battery management system 100.

Then, using FIG. 5, an example of a management method by the battery management system 100 is described. FIG. 5 schematically shows an example of a flowchart of a management method by the battery management system 100. According to the present embodiment, firstly in Step 522 (steps may be abbreviated as S), the supply-and-demand predicting unit 352 determines a battery station 140 whose supply-and-demand is expected to be tight in the future and dates and times in which the supply-and-demand is expected to be tight.

Then, in 5524, for each of battery stations 140 whose supply-and-demand is expected to be tight, the supply-and-demand predicting unit 352 extracts a user 30 who used the battery station in a given time period of the past. Also, in 5526, the supply-and-demand predicting unit 352 determines, for each of the extracted users 30, at least one of statistics of usage intervals of a battery station 140 and the most recent date and time of usage.

For example, the supply-and-demand predicting unit 352 refers to the user information storage unit 346 so as to acquire, for each of one or more extracted users 30, information that indicates the 25th percentile value of usage intervals of a battery station 140. Also, the supply-and-demand predicting unit 352 refers to the user information storage unit 346 so as to acquire, for each of one or more extracted users 30, information that indicates the most recent date and time of usage.

Then, in 5528, for each of battery stations 140 whose supply-and-demand is expected to be tight, the supply-and-demand predicting unit 352 predicts a user 30 who is likely to use the battery station in dates and times when the supply-and-demand is expected to be tight. For example, when the supply-and-demand predicting unit 352 predicts, at 15:00 on April 5, a user 30 who is likely to use a specific battery station 140 from 16:00 to 19:00 on April 5, in an embodiment, the supply-and-demand predicting unit 352 may identify, out of one or more of the user 30 who used the battery station in a given time period of the past, a user 30 whose length of an elapsed time period from the most recent date and time of usage to 16:00 on April 5 is greater than the 25th percentile value of usage intervals of the battery station 140, as a user 30 who is likely to use the specific battery station 140 from 16:00 to 19:00 on April 5.

In another embodiment, the supply-and-demand predicting unit 352 may exclude, out of the users 30 who used the battery station in a given time period of the past, a user 30 whose length of an elapsed time period from the most recent date and time of usage to 15:00 on April 5 is smaller than a predefined value so as to identify the user as a user 30 who are likely to use the specific battery station 140 from 16:00 to 19:00 on April 5.

In a similar procedure, for each of the stations whose supply-and-demand is expected to be tight, a user who is not likely to use the station on dates and times when the supply-and-demand is expected to be tight may be identified. For example, the supply-and-demand predicting unit 352 identifies, for each of the stations whose supply-and-demand is expected to be tight, a user who is likely to use the station on dates and times except for dates and times when the supply-and-demand is expected to be tight. The supply-and-demand predicting unit 352 may identify, for each of the stations whose supply-and-demand is expected to be tight, a user who is likely to use another nearby station on dates and times when the supply-and-demand is expected to be tight.

Then, in 5530, the supply-and-demand management unit 350 performs processing for adjusting the supply-and-demand balance. For example, the message transmitter 354 transmits a message. Also, the stamp transmitter 356 provides a stamp.

In the case of the above-described example, in an embodiment, the supply-and-demand management unit 350 transmits a message to users 30 who are likely to use a specific battery station 140 from 16:00 to 19:00 on April 5. In this case, the content of the message may be content that encourages these users 30 to take action different from the usual. Examples of the above-described message may include a message for notifying an expectation related to the busyness of the above-described specific battery station 140 from 16:00 to 19:00 on April 5, a message for notifying an expectation related to the busyness of the above-described specific battery station 140 and a battery station 140 arranged near the above-described specific battery station 140 from 16:00 to 19:00 on April 5, a message for notifying that there is an incentive provided for the case of not using the above-described specific battery station 140 between 16:00 and 19:00 on April 5, and the like.

In another embodiment, the supply-and-demand management unit 350 may transmit a message to users 30 who are not likely to use a specific battery station 140 from 16:00 to 19:00 on April 5. In this case, the content of the message may be content that encourages these users 30 to take action as usual.

Examples of the above-described message may include a message for notifying an expectation related to the busyness of the above-described specific battery station 140 from 16:00 to 19:00 on April 5, a message for notifying an expectation related to the busyness of the above-described specific battery station 140 and a battery station 140 arranged near the above-described specific battery station 140 from 16:00 to 19:00 on April 5, a message for notifying that there is an incentive provided for the case of not using the above-described specific battery station 140 between 16:00 and 19:00 on April 5, and the like.

FIG. 6 schematically shows an example of a data table 600. The data table 600 may be an example of information related to users 30 or battery stations 140 managed by the user management unit 330. The data table 600 may be an example of information related to the usage of battery stations 140 by the users 30. The data table 600 is stored, for example, in the user information storage unit 346.

In the present embodiment, the data table 600 associates respective identification information 620 of one or more battery stations 140 with identification information 640 of users 30 who used respective battery stations 140 within a given time period so as to store them. Also, in the present embodiment, the data table 600 associates respective identification information 620 of one or more battery stations 140 with information 650 that indicates usage for each day of the week so as to store them.

The information 650 that indicates usage for each day of the week may include identification information of one or more users who used each battery station on each day of the week within a given time period. The information 650 that indicates usage for each day of the week may include information 652 that indicates usage for each time frame related to each day of the week. The information 652 that indicates usage for each time frame may include identification information of one or more users who used each battery station during each time frame on each day of the week.

FIG. 7 schematically shows an example of a data table 700. The data table 700 may be an example of information related to a user 30 or a battery station 140 managed by the user management unit 330. The data table 700 may be an example of information related to the usage of battery stations 140 by users 30. The data table 700 is stored, for example, in the user information storage unit 346.

In the present embodiment, the data table 700 associates identification information 720 of each of one or more users 30, information 730 that indicates the most recent usage by respective users 30, and information 740 that indicates the 25th percentile of usage intervals of battery stations 140 by respective users 30 so as to store them. The information 730 that indicates the most recent usage by respective users 30 may include identification information 732 of battery stations 140 used by respective users 30, and information 734 that indicates times when respective users 30 used battery stations 140.

Figure 8:
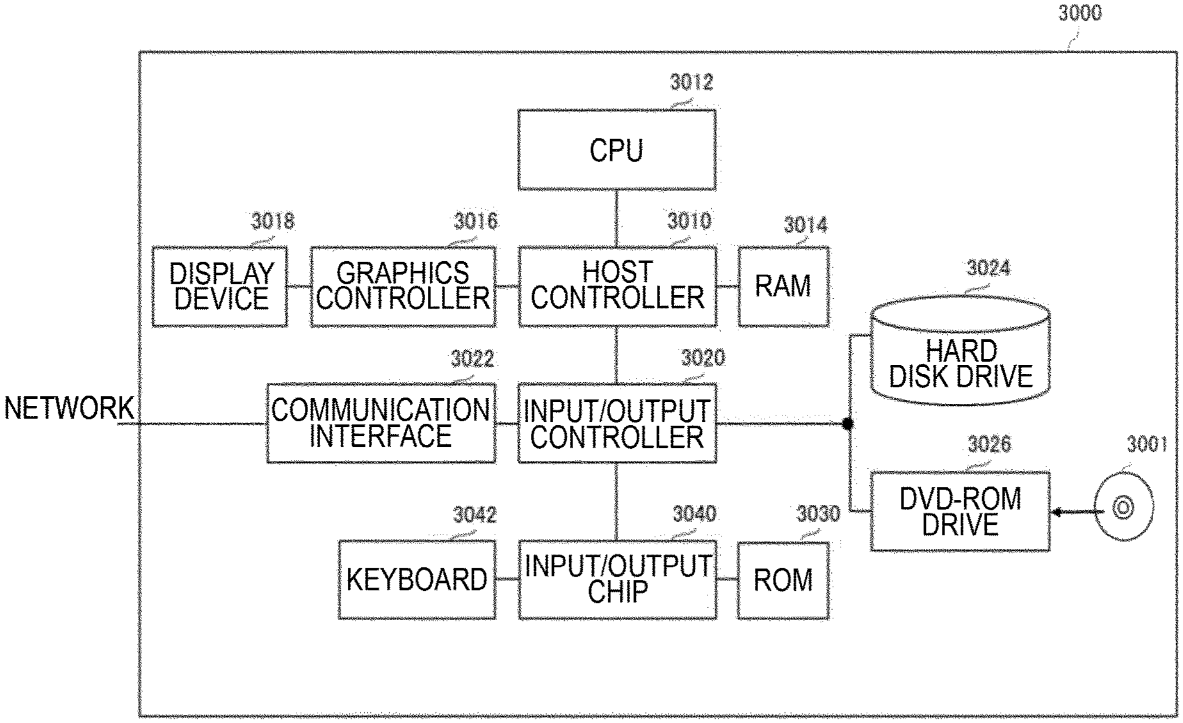
FIG. 8 schematically shows an example of a system configuration of a computer 3000.

FIG. 8 shows an example of a computer 3000 in which a plurality of aspects of the present invention may be embodied entirely or partially. For example, the management server 120 is realized by the computer 3000.

A program that is installed in the computer 3000 can cause the computer 3000 to perform an operation associated with an apparatus according to the embodiment of the present invention or to function as one or more "units" of the apparatus, or cause the computer 3000 to perform the operation or the one or more units thereof, and/or cause the computer 3000 to perform processes of the embodiment of the present invention or steps thereof. Such a program may be executed by the CPU 3012 to cause the computer 3000 to perform particular operations associated with some or all of the blocks of flowcharts and block diagrams described herein.

The computer 3000 according to the present embodiment includes the CPU 3012, a RAM 3014, a GPU 3016, and a display device 3018, which are interconnected by a host controller 3010. The computer 3000 also includes input/output units such as a communication interface 3022, a hard disk drive 3024, a DVD-ROM drive 3026, and an IC card drive, which are connected to the host controller 3010 via an input/output controller 3020. The computer also includes legacy input/output units such as a ROM 3030 and a keyboard 3042, which are connected to the input/output controller 3020 through an input/output chip 3040.

The CPU 3012 operates according to programs stored in the ROM 3030 and the RAM 3014, thereby controlling each unit. The GPU 3016 acquires image data generated by the CPU 3012 in a frame buffer or the like provided in the RAM 3014 or in itself, so that the image data is displayed on the display device 3018.

The communication interface 3022 communicates with other electronic devices via a network. The hard disk drive 3024 stores programs and data that are used by the CPU 3012 within the computer 3000. The DVD-ROM drive 3026 reads the programs or the data from the DVD-ROM 3001, and provides the hard disk drive 3024 with the programs or the data via the RAM 3014. The IC card drive reads the programs and the data from an IC card, and/or writes the programs and the data to the IC card.

The ROM 3030 stores therein a boot program or the like that is performed by the computer 3000 at the time of activation, and/or a program depending on the hardware of the computer 3000. The input/output chip 3040 may also connect various input/output units to the input/output controller 3020 via a parallel port, a serial port, a keyboard port, a mouse port or the like.

A program is provided by a computer readable storage medium, such as the DVD-ROM 3001 or the IC card. The program is read from the computer readable storage medium, installed into the hard disk drive 3024, RAM 3014, or ROM 3030, which are also examples of computer readable storage medium, and performed by the CPU 3012. The information processing written in these programs is read into the computer 3000, resulting in cooperation between a program and the above-described various types of hardware resources. An apparatus or method may be constituted by realizing the operation or processing of information in accordance with the usage of the computer 3000.

For example, when communication is performed between the computer 3000 and an external device, the CPU 3012 may execute a communication program loaded in the RAM 3014 and instruct the communication interface 3022 to perform communication processing based on process written in the communication program. Under the control of the CPU 3012, the communication interface 3022 reads transmission data stored in a transmission buffer area provided in a storage medium such as the RAM 3014, the hard disk drive 3024, the DVD-ROM 3001 or the IC card, and transmits the read transmission data to the network, or writes reception data received from the network in a reception buffer area or the like provided on the storage medium.

In addition, the CPU 3012 may cause all or a necessary portion of a file or a database to be read into the RAM 3014, the file or the database having been stored in an external storage medium such as the hard disk drive 3024, the DVD-ROM drive 3026 (DVD-ROM 3001), the IC card, etc., and perform various types of processing on the data on the RAM 3014. The CPU 3012 may then write back the processed data to the external storage medium.

Various types of information, such as various types of programs, data, tables, and databases, may be stored in the storage medium to undergo an information processing. The CPU 3012 may execute, against the data read from the RAM 3014, various types of processing, including various types of operations designated by an instruction sequence of a program, which are described throughout this disclosure, an information processing, a condition judgment, a conditional branch, an unconditional branch, information search/replacement, etc., and write back the result to the RAM 3014. Moreover, the CPU 3012 may search information in a file in a storage medium, in a database, etc. For example, if multiple entries, each having an attribute value of a first attribute associated with an attribute value of a second attribute, are stored in the storage medium, the CPU 3012 may search for an entry matching with the condition in which the attribute value of the first attribute is designated from among the multiple entries, read the attribute value of the second attribute stored in the entry, and thereby acquire the attribute value of the second attribute associated with the first attribute which satisfies the predefined condition.

A program or a software module explained above may be stored in a computer 3000 or in a computer-readable storage medium in proximity to the computer 3000. Furthermore, a storage medium such as a hard disk or a RAM provided within a server system connected to a dedicated communication network or the Internet can be used as a computer-readable storage medium, to thereby provide the above-described program to the computer 3000 via the network.

While the embodiments of the present invention have been described, the technical scope of the invention is not limited to the above-described embodiments. It is apparent to persons skilled in the art that various alterations and improvements can be added to the above-described embodiments. Also, to the extent not being technically inconsistent, matters explained about a given embodiment can be applied to other embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not particularly indicated by "prior to," "before," or the like and as long as the output from a previous process is not used in a later process. Even if the process flow is described using phrases such as "first" or "next" in the claims, embodiments, or diagrams for convenience, it does not necessarily mean that the process must be performed in this order.

While the embodiments of the present invention have been described, the technical scope of the invention is not limited to the above-described embodiments. It is apparent to persons skilled in the art that various alterations and improvements can be added to the above-described embodiments. Also, to the extent not being technically inconsistent, matters explained about a given embodiment can be applied to other embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not particularly indicated by "prior to," "before," or the like and as long as the output from a previous process is not used in a later process. Even if the process flow is described using phrases such as "first" or "next" in the claims, embodiments, or diagrams for convenience, it does not necessarily mean that the process must be performed in this order.

REFERENCE SIGNS LIST

10 Communication network, 20 Battery, 30 user, 32 Communication terminal, 34 Electric motorcycle, 100 Battery management system, 120 Management server, 140 Battery station, 222 Histogram, 224 Histogram, 226 Histogram, 232 Histogram, 242 Battery station, 244 Battery station, 246 Battery station, 310 State monitoring unit, 320 Battery management unit, 330 User management unit, 340 Storage unit, 342 Battery information storage unit, 344 Station information storage unit, 346 User information storage unit, 350 Supply-and-demand management unit, 352 Supply-and-demand predicting unit, 354 Message transmitter, 356 Stamp transmitter, 420 Charging unit, 422 Battery accommodation chamber, 424 Measurement equipment, 426 Charging circuit, 430 Stamp output unit, 432 Receiver, 434 Near-field communication unit, 436 Printer, 440 Control unit, 442 Communication control unit, 444 Charging and discharging control unit, 446 Lending management unit, 448 Storage unit, 600 Data table, 620 Identification information, 640 Identification information, 650 Information, 652 Information, 700 Data table, 720 Identification information, 730 Information, 732 Identification information, 734 Information, 740 Information, 3000 Computer, 3001 DVD-ROM, 3010 Host controller, 3012 CPU, 3014 RAM, 3016 GPU, 3018 Display device, 3020 Input/output controller, 3022 Communication interface, 3024 Hard disk drive, 3026 DVD-ROM drive, 3030 ROM, 3040 Input/output chip, 3042 Keyboard

What is claimed is:

1. An information processing device comprising at least one hardware processor, wherein:

the at least one hardware processor predicts a first user who is one of a plurality of first users that will use a storage apparatus that stores a power storage device in a first time period subsequent to a current time point;

the storage apparatus is one of a plurality of storage apparatuses;

the at least one hardware processor predicts the first user based on usage information that indicates usage history of a second user who is one of a plurality of second users having used the storage apparatus in a second time period prior to the first time period;

the usage information includes information related to a time frame when the second user used the storage apparatus in the second time period;

the at least one hardware processor predicts that at least one of the plurality of second users who used, in the second time period, the storage apparatus, will use the storage apparatus in the first time period;

the at least one hardware processor extracts, based on the usage information, at least one of the plurality of second users whose number of times or frequency of having used, in the second time period, the storage apparatus, satisfies a first extraction condition;

the at least one hardware processor selects, out of the at least one of the plurality of second users extracted by the at least one hardware processor, the second user who satisfies a first selection condition as the first user;

the at least one hardware processor reports information related to usage of the storage apparatus in the first time period to a communication terminal of the first user; and the first selection condition is a condition that a length of an elapsed time period since a time of last using any one of the plurality storage apparatuses is greater than a first threshold.

2. The information processing device according to claim 1, wherein the usage information includes information related to a day of week when the second user used the storage apparatus in the second time period, and wherein the at least one hardware processor predicts that the at least one of the plurality of second users who used, in the second time period, the storage apparatus on a day of week to which the first time period belongs, will use the storage apparatus in the first time period.

3. The information processing device according to claim 2, wherein:

the at least one hardware processor extracts, based on the usage information, the at least one of the plurality of second users whose frequency of having used, in the second time period, the storage apparatus on a day of week to which the first time period belongs satisfies a second extraction condition; and the at least one hardware processor selects, out of the at least one of the plurality of second users extracted by the at least one hardware processor, the second user who satisfies a second selection condition as the first user.

4. The information processing device according to claim 3, wherein the second selection condition is a condition that a length of an elapsed time period since a time of last using any one of the plurality of storage apparatuses last is greater than a second threshold.

5. The information processing device according to claim 1, the at least one hardware processor predicts whether the second user will use the storage apparatus in the first time period, based on a length of an elapsed time period since a time when the at least one of the plurality of second users last used any one of the plurality of storage apparatuses in the second time period, prior to the first time period.

6. The information processing device according to claim 5, wherein the at least one hardware processor predicts that at least one of the plurality of second users will use the storage apparatus in the first time period when the length of the elapsed time period since when the at least one of the plurality of second users last used any one of the plurality of storage apparatuses in the second time period, prior to the first time period, is greater than a third threshold.

7. The information processing device according to claim 6, wherein the third threshold is defined based on usage history by the at least one of the plurality of second users of the plurality of storage apparatuses in the second time period.

8. An information processing device comprising at least one hardware processor, wherein:

the at least one hardware processor reports information related to usage of a storage apparatus in a first time period, to a communication terminal of a first user who is one of a plurality of first users whose probability of using the storage apparatus in the first time period subsequent to a current time point is greater than a predefined threshold;

the storage apparatus is one of a plurality of storage apparatuses;

the at least one hardware processor predicts the first user based on usage information that indicates usage history of a second user who is one of a plurality of second or more users having used the storage apparatus in a second time period prior to the first time period;

the usage information includes information related to a time frame when the second user used the storage apparatus in the second time period;

the at least one hardware processor predicts that at least one some of the plurality of second users who used, in the second time period, the storage apparatus, will use the storage apparatus in the first time period;

the at least one hardware processor extracts, based on the usage information, the at least one of the plurality of second users whose number of times or frequency of having used, in the second time period, the storage apparatus, satisfies a first extraction condition;

the at least one hardware processor selects, out of the at least one of the plurality of second users extracted by the at least one hardware processor, the second user who satisfies a first selection condition as the first user; and the first selection condition is a condition that a length of an elapsed time period since a time of last using any one of the plurality storage apparatuses is greater than a first threshold.

9. An information processing method, using the at least one processor, comprising predicting a first user who is one of a plurality of first users that will be using a storage apparatus that stores a power storage device in a first time period subsequent to a current time point, wherein the storage apparatus is one of a plurality of storage apparatuses, wherein the predicting predicts, using the at least one processor, the first user based on usage information that indicates usage history of a second user who is one of a plurality of second users having used the storage apparatus in a second time period prior to the first time period, wherein the usage information includes information related to a time frame when the second user used the storage apparatus in the second time period, wherein the predicting predicts, using the at least one processor, that at least one of the plurality of second users who used, in the second time period, the storage apparatus, will use the storage apparatus in the first time period, and wherein the predicting comprises:

extracting, using the at least one processor, based on the usage information, at least one of the plurality of second users whose number of times or frequency of having used, in the second time period, the storage apparatus, satisfies a first extraction condition; and a first selecting that selects, using the at least one processor, out of the plurality of second users extracted by the first extracting, the second user who satisfies a first selection condition as the first user, and wherein the first selection condition is a condition that a length of an elapsed time period since a time of last using any one of the plurality storage apparatuses is greater than a first threshold; and reporting information related to usage of the storage apparatus in the first time period to a communication terminal of the first user.

10. An information processing method, using the at least one processor, comprising:

predicting a first user who is one of a plurality of first users using a storage apparatus that stores a power storage device in a first time period subsequent to a current time point, wherein the storage apparatus is one of a plurality of storage apparatuses; and reporting information related to usage of the storage apparatus in the first time period, to a communication terminal of the first user whose probability of using the storage apparatus in the first time period subsequent to the current time point is greater than a predefined threshold, wherein the predicting predicts, using the at least one processor, the first user based on usage information that indicates usage history of a second user who is one of a plurality of second users having used the storage apparatus in a second time period prior to the first time period, wherein the usage information includes information related to a time frame when the second user used the storage apparatus in the second time period, wherein the predicting predicts, using the at least one processor, that at least one of the plurality of second users who used, in the second time period, the storage apparatus, will use the storage apparatus in the first time period, wherein the predicting comprises:

a first extracting that extracts, using the at least one processor, based on the usage information, at least one of the plurality of second users whose number of times or frequency of having used, in the second time period, the storage apparatus, satisfies a first extraction condition; and a first selecting that selects, using the at least one processor, out of the at least one of the plurality of second users extracted by the first extracting, the second user who satisfies a first selection condition as the first user, and wherein the first selection condition is a condition that a length of an elapsed time period since a time of last using any one of the plurality storage apparatuses is greater than a first threshold.

11. A non-transitory computer-readable storage medium having stored thereon a program that causes a computer to perform:

predicting a first user who is one of a plurality of first users using a storage apparatus that stores a power storage device in a first time period subsequent to a current time point, wherein the storage apparatus is one of a plurality of storage apparatuses; and reporting information related to usage of the storage apparatus in the first time period, to a communication terminal of the first user whose probability of using the storage apparatus in the first time period is greater than a predefined threshold, wherein the predicting predicts the first user based on usage information that indicates usage history of a second user who is one of a plurality of second users having used the storage apparatus in a second time period prior to the first time period, wherein the usage information includes information related to a time frame when the second user used the storage apparatus in the second time period, wherein the predicting predicts that at least one of the plurality of second users who used, in the second time period, the storage apparatus, will use the storage apparatus in the first time period, wherein the predicting comprises:

a first extracting that extracts, based on the usage information, at least one of the plurality of second users whose number of times or frequency of having used, in the second time period, the storage apparatus, satisfies a first extraction condition; and a first selecting that selects, out of the at least one of the plurality of second users extracted by the first extracting, the second user who satisfies a first selection condition as the first user, and wherein the first selection condition is a condition that a length of an elapsed time period since a time of last using any one of the plurality storage apparatuses is greater than a first threshold.

12. An information processing device comprising at least one hardware processor, wherein:

the at least one hardware processor predicts a first user who is one of a plurality of first users that will use a storage apparatus that stores a power storage device in a first time period subsequent to a current time point;

the storage apparatus is one of a plurality of storage apparatuses;

the at least one hardware processor predicts the first user based on usage information that indicates usage history of a second user who is one of a plurality of second users having used the storage apparatus in a second time period prior to the first time period;

the usage information includes information related to a day of week when the second user used the storage apparatus in the second time period;

the at least one hardware processor predicts that at least one of the plurality of second users who used, in the second time period, the storage apparatus on a day of week to which the first time period belongs, will use the storage apparatus in the first time period;

the at least one hardware processor extracts, based on the usage information, at least one of the plurality of second users whose number of times or frequency of having used, in the second time period, the storage apparatus, satisfies a first extraction condition;

the at least one hardware processor selects, out of the at least one of the plurality of second users extracted by the at least one hardware processor, the second user who satisfies a first selection condition as the first user; and the at least one hardware processor reports information related to usage of the storage apparatus in the first time period to a communication terminal of the first user.

13. An information processing device comprising at least one hardware processor, wherein:

the at least one hardware processor predicts a first user who is one of a plurality of first users that will use a storage apparatus that stores a power storage device in a first time period subsequent to a current time point;

the storage apparatus is one of a plurality of storage apparatuses;

the at least one hardware processor predicts the first user based on usage information that indicates usage history of a second user who is one of a plurality of second users having used the storage apparatus in a second time period prior to the first time period;

the usage information includes information related to a time frame when the second user used the storage apparatus in the second time period;

the at least one hardware processor predicts that at least one of the plurality of second users who used, in the second time period, the storage apparatus, will use the storage apparatus in the first time period, based on a length of an elapsed time period since a time when the at least one of the plurality of second users last used any one of the plurality of storage apparatuses in the second time period;

the at least one hardware processor extracts, based on the usage information, at least one of the plurality of second users whose number of times or frequency of having used, in the second time period, the storage apparatus, satisfies a first extraction condition;

the at least one hardware processor selects, out of the at least one of the plurality of second users extracted by the at least one hardware processor, the second user who satisfies a first selection condition as the first user; and the at least one hardware processor reports information related to usage of the storage apparatus in the first time period to a communication terminal of the first user.

* * * * *